(12) United States Patent
Nentwig et al.

(10) Patent No.: US 8,295,153 B2
(45) Date of Patent: Oct. 23, 2012

(54) RADIO RESOURCE SHARING

(75) Inventors: Markus Nentwig, Helsinki (FI); Pekka Janis, Espoo (FI)

(73) Assignee: Nokia Corporation, Espoo (FI)

( * ) Notice: Subject to any disclaimer, the term of this patent is extended or adjusted under 35 U.S.C. 154(b) by 973 days.

(21) Appl. No.: 12/317,590

(22) Filed: Dec. 23, 2008

(65) Prior Publication Data

US 2010/0157910 A1  Jun. 24, 2010

(51) Int. Cl.
*H04J 9/00* (2006.01)
*H04J 3/22* (2006.01)
*H04W 4/00* (2009.01)

(52) U.S. Cl. .................... 370/204; 370/329; 370/465

(58) Field of Classification Search .......... 370/203–204, 370/310–350, 395.4, 464–465
See application file for complete search history.

(56) References Cited

U.S. PATENT DOCUMENTS

| | | | |
|---|---|---|---|
| 7,444,132 B2 * | 10/2008 | Pan et al. .................. | 455/407 |
| 2007/0202856 A1 | 8/2007 | Karaoguz et al. .......... | 455/414.1 |
| 2007/0258544 A1 * | 11/2007 | Cleveland et al. .......... | 375/299 |
| 2007/0291635 A1 * | 12/2007 | Yang et al. ................ | 370/208 |
| 2008/0025254 A1 * | 1/2008 | Love et al. ................ | 370/329 |
| 2008/0070510 A1 | 3/2008 | Doppler et al. ............ | 455/69 |
| 2008/0101309 A1 * | 5/2008 | Taniguchi ................. | 370/340 |
| 2008/0112361 A1 * | 5/2008 | Wu .......................... | 370/330 |
| 2008/0113624 A1 | 5/2008 | Seidel et al. .............. | 455/67.13 |
| 2009/0080386 A1 * | 3/2009 | Yavuz et al. ............... | 370/337 |
| 2010/0069013 A1 | 3/2010 | Chaudhri et al. .......... | 455/67.11 |

FOREIGN PATENT DOCUMENTS

| | | |
|---|---|---|
| EP | 1 816 883 A1 | 8/2007 |
| EP | 1850611 A1 | 10/2007 |
| EP | 1 942 615 A1 | 7/2008 |
| EP | 1944996 A2 | 7/2008 |
| WO | WO 2008/035161 A2 | 3/2008 |

(Continued)

OTHER PUBLICATIONS

"Wireless Communications and Coexistence for Smart environments", Jon M. Peha, IEEE Personal Communications, Oct. 2000, 3 pgs.

(Continued)

*Primary Examiner* — Warner Wong
(74) *Attorney, Agent, or Firm* — Harrington & Smith

(57) ABSTRACT

An apparatus includes a controller configured to be coupled with a radio interface of a first wireless network node. The controller is further configured to respond to a spectrum emission mask that includes indications of both desirable emissions and undesirable emissions over a plurality of radio resource allocation units and to estimate a signal to noise ratio in individual ones of radio resource allocation units at at least one second node, to select an appropriate modulation-and-coding scheme per radio resource allocation unit and to schedule transmissions for the radio interface on the radio resource allocation units using the selected modulation-and-coding scheme. The controller is further configured to receive via the radio interface a beacon transmission from a second node, where the beacon transmission indicates a receiver sensitivity of the second node. The controller estimates a path loss to the second node that transmitted the beacon in accordance with knowledge of a transmission power with which the beacon was transmitted and considers distortion characteristics associated with the radio interface, the estimated path loss and the estimated signal to noise ratio so as to allocate transmit signal energy such that a sum of the desirable emissions and the undesirable emissions is less than limits imposed by the spectrum emission mask.

29 Claims, 8 Drawing Sheets

FOREIGN PATENT DOCUMENTS

WO    WO 2009/125056 A1    10/2009

OTHER PUBLICATIONS

"Etiquette Modification for Unlicensed Spectrum: Approach and Impact", Durga P. Satapathy et al., IEEE 1998, pp. 272-276.

"Spectrum Sharing and Flexible Spectrum Use", Kimmo Kalliola, FUTURA Workshop Aug. 16, 2004, 20 pgs.

"Flexible Spectrum Use and Laws of Physics", Ryszard Struzak, ITU-UBF Workshop on Market Mechanisms for Spectrum Management, Jan. 21-22, 2007, 15 pgs.

"$3^{rd}$ Generation Partnership Project; Technical Specification Group Radio Access Network; Requirements for Further Advancements for E-UTRA (LTE-Advanced (Release 8)", 3GPP TR 36.913 V8.0.0, Jun. 2008, 14 pgs.

"$3^{rd}$ Generation Partnership Project; Technical Specification Group Radio Access Network; Evolved Universal Terrestrial Radio Access (EUTRA) and Evolved Universal Terrestrial Access Network (EUTRAN); Overall description; Stage 2 (Release 8)", 3GPP TS 36.300, Sep. 2008, 137 pgs.

\* cited by examiner

RADIO RESOURCE SHARING

TECHNICAL FIELD

The exemplary and non-limiting embodiments of this invention relate generally to wireless communication systems, methods, devices and computer programs and, more specifically, relate to techniques to share radio resources amongst various radio apparatus including access points and user equipment, such as in a wireless network that operates with flexible spectrum use.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
3GPP third generation partnership project
AU allocation unit
DL downlink (eNB towards UE)
eNB EUTRAN Node B (evolved Node B)
EPC evolved packet core
EUTRAN evolved UTRAN (LTE)
FDD frequency division duplex
FDMA frequency division multiple access
LTE long term evolution
LTE-A LTE advanced
MAC medium access control
MM/MME mobility management/mobility management entity
Node B base station
OFDMA orthogonal frequency division multiple access
O&M operations and maintenance
PDCCH physical downlink control channel
PDCP packet data convergence protocol
PHY physical
QoS quality of service
RLC radio link control
RRC radio resource control
S-GW serving gateway
SC-FDMA single carrier, frequency division multiple access
TDD time division duplex
UE user equipment
UL uplink (UE towards eNB)
UTRAN universal terrestrial radio access network
VoIP voice over internet protocol As employed herein LTE/IMT-A indicates LTE on longer time scale (e.g., Release 10 and beyond, including FSU and interference management capabilities).

As employed herein WLAN indicates an IEEE 802.11 type radio system that implements a contention-based sharing mechanism for radio resources.

The use of unlicensed radio bands has facilitated the implementation of WLAN and other important types of wireless communication systems. However, due to a lack of rules and regulations regarding the sharing of common radio resources these systems may not operate at their full potential, and furthermore implementations of these systems may suffer from an inability to be effectively scaled.

Regulatory authorities have recognized the usefulness of unlicensed bands, and may agree on, new spectrum allocations for unlicensed use. However, simply providing additional spectrum does not solve the basic problem related to cooperative sharing of the spectrum between the users of the radio resources.

The concept of "cognitive radio" has been proposed/developed at least partially in response to these problems. For example, a considerable amount of effort in cognitive radio development has been directed to achieving non-interfering coexistence with "legacy systems", such as existing cellular wireless communication systems. If it were possible to share radio bands With existing non-cognitive systems then more spectrum could be made available. However, in regards to the allocation of future-license-free radio bands a different set of problems arise that require unique solutions (e.g., solutions that may be less efficient and more complicated than the use of a band reserved for FSU-enabled radios).

There is common agreement that fixed radio resource allocations, as commonly used in current wireless communication systems, are inefficient. The majority of all radio spectrum in a given physical location is effectively unused and could be utilized without both causing or suffering intolerable interference.

The authorities in charge of spectrum allocations (typically government agencies) have recognized the potential of a more flexible spectrum access, and are working towards deregulating access to at least part of the radio spectrum. Key enablers for the implementation of new spectrum sharing methods include progress in digital technology and the trend towards the use of wider bandwidths.

Significant research effort has been invested in the context of "cognitive radio" on enabling next-generation radio devices to share spectrum used by an existing system. The cognitive radio would operate to attempt to sense the presence of existing users of a radio resource (primary users), and to determine whether it is possible to reuse the spectrum without causing intolerable interference to the primary user. This task may be very difficult to accomplish since in most cases it is only possible to sense the presence of a transmitter, whereas interference occurs at a receiver that cannot be directly sensed. This is known as a "hidden-node problem". For example, the operators of fixed satellite services assert that sharing satellite bands is not possible. Certain critical problems need to be solved first, both of a technical and a political nature, and "flexible spectrum use" (FSU) in such bands is a long-term target.

There is a clear need for frequency allocation. Currently, the ISM bands, for example WLAN, are heavily used and relied upon. But radio systems in these bands do not scale to high user densities, as for example in a case where there may be a large number of personal wireless devices with wireless broadband connectivity. While the openness of the ISM bands was a key contributor to the success of WLAN, it can be clearly seen now that it is limiting the scalability.

It is expected that spectrum regulation authorities will meet the demands for growing wireless broadband connectivity by allocating new radio spectrum in the low GHz range. These allocations may abandon the conventional and inefficient exclusive grant of one radio resource to a single operator. If this is the case, then there will be needed some means of coordination between devices to share the radio resources in a fair and efficient manner.

SUMMARY

The foregoing and other problems are overcome, and other advantages are realized, by the use of the exemplary embodiments of this invention.

In a first aspect thereof the exemplary embodiments of this invention provide a method that comprises providing at a first node a spectrum emission mask that comprises indications of both desirable emissions and undesirable emissions over a plurality of radio resource allocation units; using the spectrum emission mask for estimating a signal to noise ratio in individual ones of radio resource allocation units at at least one second node; selecting an appropriate modulation-and-coding scheme per radio resource allocation unit; and scheduling transmissions on the radio resource allocation units using the selected modulation-and-coding schemes.

In another aspect thereof the exemplary embodiments of this invention provide a computer-readable memory medium that stores program instructions, the execution of the program instructions resulting in operations that comprise, responsive to a spectrum emission mask that comprises indications of both desirable emissions and undesirable emissions over a plurality of radio resource allocation units, using at a first node the spectrum emission mask for estimating a signal to noise ratio in individual ones of radio resource allocation units at at least one second node; selecting an appropriate modulation-and-coding scheme per radio resource allocation unit; and scheduling transmissions on the radio resource allocation units using the selected modulation-and-coding schemes.

In another aspect thereof the exemplary embodiments of this invention provide an apparatus that comprises a controller configured to be coupled with a radio interface of a first wireless network node, said controller further configured to respond to a spectrum emission mask that comprises indications of both desirable emissions and undesirable emissions over a plurality of radio resource allocation units and to estimate a signal to noise ratio in individual ones of radio resource allocation units at at least one second node, to select an appropriate modulation-and-coding scheme per radio resource allocation unit and to schedule transmissions for the radio interface on the radio resource allocation units using the selected modulation-and-coding schemes.

DETAILED DESCRIPTION

The exemplary embodiments of this invention relate to wireless radio transmissions, for example cellular, with special (but not exclusive) emphasis on radio links that provide high data rates over short distances (local area deployments).

One assumption is that future networks may involve a higher degree of self-organization, avoiding expensive frequency planning particularly in environments with a high density of access points.

The exemplary embodiments of this invention provide in one aspect thereof an ability for devices operating under a FSU policy to adhere to common rules to negotiate the use of the available radio resource.

Described herein is a novel method for radio resource sharing. In the method it is assumed that the radio spectrum of interest is divided into allocation units (AUs). As one non-limiting example there may be 12 subcarriers of 15 kHz each in an LTE-like OFDM system.

Figure 1:
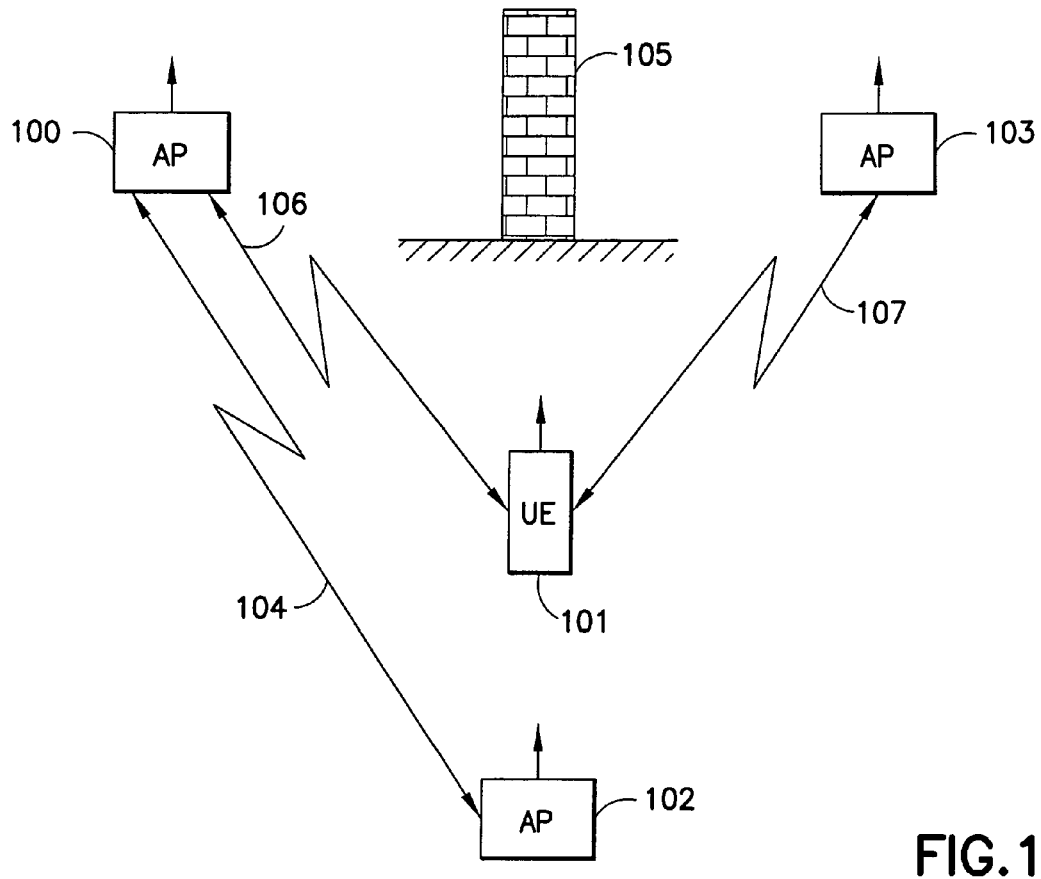
FIG. 1 is a block diagram showing a radio environment that includes access points and a Mobile device or user equipment.

FIG. 1 shows a radio environment with an access point (AP) 100 and a mobile device or user equipment (UE) 101. Assume that the AP 100 wishes to acquire additional radio resources for data transfer to the UE 101. Assume also that the radio band is shared with other APs 102 and 103, possibly belonging to a different network. It is assumed in this example that direct communication between AP 100 and APs 102 and 103 is not possible through a network backbone (otherwise, the FSU signaling may be simplified greatly).

In this example it is further assumed that APs 102 and 103 are in range of the UE 101 and may create interference if they would use the same radio resource at too high a power level. As a result, AP 100 first enters FSU negotiations with the other APs 102, 103 with the intention of avoiding simultaneous use of the same radio resource and preventing interference at UE 101. For this purpose messages are exchanged (signaling occurs) between AP 100 and APs 102 and 103 to agree on a resource allocation.

This signaling may use beacons (messages that may be broadcast regularly) as well as random access messages.

Since the APs 100 and 102 are within radio range of each other, a direct link 104 could be established. For APs 100 and 103 this is not possible as the radio path is assumed to be blocked by an obstacle 105. As a result the signaling between AP 100 and AP 103 is relayed by the UE 101, using link 106 and link 107 (the AP-related signaling may be multiplexed into existing control signaling between AP 100 and UE 101).

Figure 2:
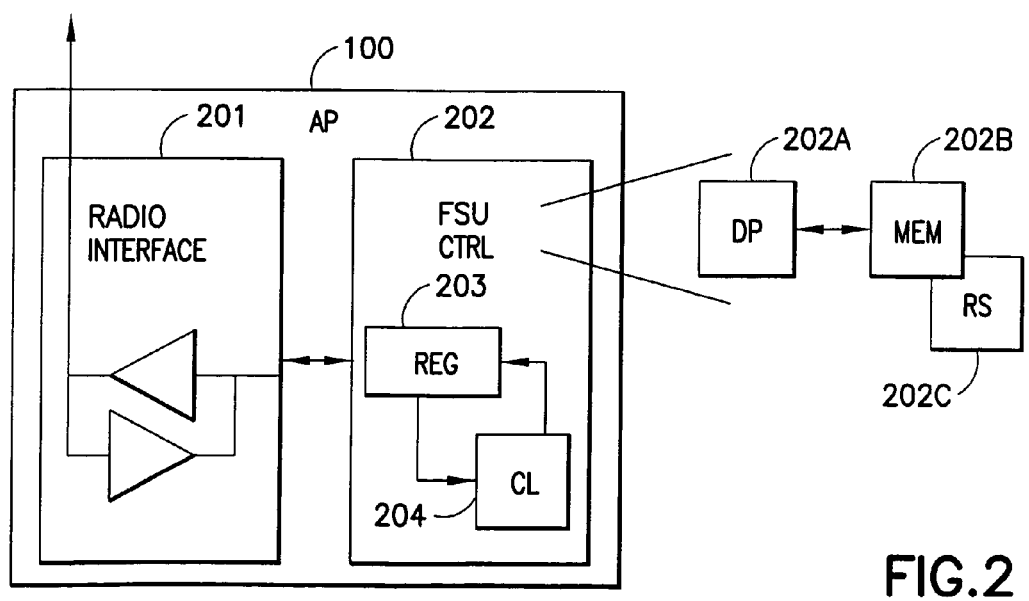
FIG. 2 is a block diagram showing a FSU-enabled radio device.

FIG. 2 shows a FSU-enabled radio device, using AP 100 as an example (the other FSU-enabled radio devices may be assumed to be similar). A radio interface 201 processes control/data transfer with other devices within the same network (e.g., UE 101). Furthermore, it processes FSU signaling, for example the links 104 and 106. FSU-related signaling is passed to an FSU controller 202. The FSU controller 202 receives and transmits FSU signaling via the radio interface 201. In accordance with the exemplary aspects of this invention the FSU controller 202 determines a resource allocation strategy; in accordance with a set of common rules (discussed below) that avoid greedy behavior and that enforce fair and efficient sharing of resources. The FSU controller 202 initiates signaling to other users of the radio spectrum (AP 102 and 103 in the example of FIG. 1). Once agreement is reached the FSU controller 202 configures the radio interface 201 to use the acquired radio resources for data transmission (e.g., with the UE 101 in the example of FIG. 1).

The radio interface 201 is assumed to include one or more radio power amplifiers and receiver amplifiers, as well as other radio-related circuitry including one or more modulators, demodulators and related circuitry. The radio interface 201 may be embodied in one or more integrated circuits, and may also include all or some of associated baseband circuitry. The FSU controller 202 is assumed to include at least one controller, such as a data processor (DP) 202A coupled with a memory (MEM) 202B (a computer-readable memory medium) that stores a program of instructions that when executed by the DP 202A result in the performance of the methods in accordance with the exemplary embodiments of this invention. The memory 202B may also store data representing a rules set (RS) 202C, described in detail below. The FSU controller 202 may be embodied as a part of the baseband circuitry of the radio unit (e.g., the AP), or it may be embodied as a unit, such as an integrated circuit, separated from the baseband circuitry.

As was noted above, it is assumed that the use of radio resources is governed by common rules, enforced by type approval. Only compliant devices may legally use the FSU-enabled band. Still referring to FIG. 2, these rules (the RS 202C) are implemented via the FSU controller 202 that is part of every radio device, such as the AP 100. The FSU controller 202 is connected with the radio interface 201 that enables bidirectional wireless communication to occur with other radio devices.

The FSU controller 202, determines an allocation of radio resources for transmission that complies with the standardized common rules set 202C. In general, the FSU controller 202 determines a maximum transmit power for each AU, and configures the radio interface 201 to adjust the transmit power for each AU accordingly.

Basic rules that form a part of the rules set 202C that are considered by the FSU controller 202 may include, but are not limited to:

(a) for every unit of time, every device earns a number of "credit units" or CUs;

(b) a "budget" of credit units can be accumulated, up to a limit;

(c) credit units are expended (consumed) when using radio resources;

(d) as long as only one device contends for a given AU, the "cost" of that AU is minimal; and (e) a device that uses an AU transmits a beacon including the "price" it currently pays, therefore other devices can sense usage of the AU.

As should be appreciated, if two nearby devices try to use the same AU, they cause interference. To avoid this interference, a certain device A may signal a higher "bid" for an AU to device B. By doing so it may force device B to back off its transmit power in the AU, or stop using it entirely.

For example, device B may signal that it currently is paying 3 CUs for the use of $AU_x$. Device A senses this from the beacon transmitted by device B, and may bid in its own transmitted beacon 5 CUs for the use of $AU_x$. At this point device B has the option to make a higher bid (e.g., 10 CUs for $AU_x$, or 30 CUs if it has an urgent need say to transmit data to the UE 101), or to relinquish $AU_x$ to device A.

Further by example, assume that AP 103 desires to transmit, while UE 101 desires that AP 103 not transmit. Assume that the auction process is initiated by AP 103 bidding 1 CU for the right to transmit on $AU_x$. In response, UE 101 bids 2 CUs for $AU_x$ in order to prevent AP 103 from transmitting. In response, AP 103 increases the bid to 3 CUs. At this point UE 101 may simply not respond (not increase the bid on a transmitted beacon), or it may increase its own bid, either by another bid increment (e.g., it may bid 4 CUs), or by some larger increment intended to prevent AP 103 from gaining the right to transmit oh $AU_x$, e.g., UE 101 may bid 20 CUs.

Assume in this case that no response is received from AP 103, and after some suitable timeout UE 101 takes control of $AU_x$, and may indicate this by transmitting in its beacon that $AU_x$ now belongs to UE 101 for some period of time (e.g., until t=300). However, during this period AP 103 may place another bid for control of $AU_x$ starting at t=301 (e.g., AP 103 bids 3 CUs for $AU_x$ beginning at t=301). UE 101 may acquiesce (e.g., UE 101 may no longer need $AU_x$ after t=300), or it may overbid AP 103 for the right to use $AU_x$ at t=301 (e.g., by bidding 4CUs for the right to use $AU_x$ beginning at t=301). This process may continue during the entire time that UE 101 controls $AU_x$, e.g., up to t=300. At the end of this period either UE 101 will retain control of $AU_x$, having outbid AP 103, or AP 103 will assume control of $AU_x$ having outbid UE 101. Of course, during this period another node (e.g., AP 102, or another UE) may enter the bidding process for $AU_x$.

Assume further that while AP 103 has ownership of $AU_x$ (e.g., from t=301 to t=670) that another UE moves into range and bids for $AU_x$. On this occurrence AP 103, in its beacon, will inform the newly arrived UE that $AU_x$ belongs to AP 103 until t=670, at which point the newly arrived UE can backoff, or can make a bid for another resource $AU_y$.

In this auction procedure it is assumed that a winning bid is binding on the node having the highest bid.

It may be desirable that the beacons be transmitted so that they are orthogonal to one another to enable simultaneous reception of two or more beacons by a particular node. Any suitable technique may be used to establish beacon orthogonality, including frequency, time and/or code division techniques. In the event of a collision between beacons the FSU controller 202 may detect the collision, such as from a reduced beacon SNR, and take appropriate action.

In a crowded radio system, the average prices (CU values) of AUs will tend to increase because of the bidding procedure, reflecting a reduced. "fair share" of resources.

The implementation of the bidding strategy may be device-specific. For example, for the UEs 101 there may be fixed budget to ensure that every user is entitled to a fair and equal share of radio resources. For the APs, the budget may be determined at least in part by the number of served UEs.

Certain further rules may also be used, including as non-limiting examples:

(f) as was noted above, bids may be placed for a future allocation, for example a certain device bids "10 CU for AU 123 from $t_0+10$ to $t_0+15$", where $t_o$ is the current time, or where $t_o$ is a future time (e.g., the time when a current reservation for AU 123 expires, as in the example given above);

(g) CUs may be passed from the user equipment 101 to the access point (note that most of the traffic will typically be downlink), e.g., the "fair share" of radio resources to an AP serving 10 UEs 101 may be about 10 times that of an AP serving only one UE 101;

(h) the cost is proportional to the interference area associated with a certain transmit power; and (i) it may be assumed that signaling induces cost, increasing with system load (finite FSU signaling resources may become a bottleneck in a highly loaded system, e.g., a lecture hall with 500 students attempting to access the same document).

Note with regard to (h) that a receiver may also reserve resources, such as to prevent another unit from transmitting using those resources. As such, one may more generally say that the cost is proportional to an area over which a reservation of a radio resource denies the use of the resource to another user.

The length of a new reservation obeys a set of common rules. The rules may take into account the utilization of FSU signaling resources. For example, the length of a new reservation may be required to lie within the interval $$t_{min} = \min(256*(1/p), 32768) \text{ and}$$

$$t_{max} = 32*t_{min},$$

where p is an estimate of the proportion of FSU signaling resources that are unutilized. As can be seen, the lower the ratio of free signaling resources, the longer is the resulting allocation time (up to a limit), resulting in a reduced need for signaling. Further, the rules may allow a bidding node to allocate resources at a length outside the $[t_{min}, t_{max}]$ interval, by paying a higher price. For example, a rule may allow an allocation with a length within the interval $[0.5\ t_{min}, 2\ t_{max}]$ if the price is doubled (i e., the price subtracted from the budget is twice the bid value).

In some situations, for example when there is a considerable difference in average price between the locations of the two nodes, one node may transfer credits to the other node. The amount of credits transferred in this manner may be limited by a rule, for example to not exceed 25% of the total budget. The transfer of resources may be communicated between nodes using a control channel on the existing radio link.

The FSU controller 202, as part of every compliant device, configures the radio interface 201 with a vector of power-per-frequency values. The FSU controller 202 may be assumed to further include at least one register 203 that stores the number of CUs currently owned (accumulated) by the radio device, and to also include control logic (CL) 204 that increments the CU value of the register 203 per time unit, and that further decrements the CU value of the register 203 to reflect the consumption of CUs by the FSU controller 202.

A basic feature of any cellular-like radio network is that the more users that are accommodated, the smaller are the cells with lower transmission power used in each cell (i.e., cell size and transmission power scale with the number of users that are served). The exemplary embodiments of this invention implement this type of scalability in a controlled manner (controlled by the design of the rules set 202C governing resource use).

As can be appreciated, no central coordination is required. Further, if sufficient processing power is available the resource sharing mechanism may implement cognitive features. For example, a certain device may infer that another device reserves only periodic bursts for a low-rate VoIP connection, and may adjust its own long-time scheduling of resources accordingly.

The exemplary embodiments of this invention provide techniques for achieving efficient radio resource sharing that are applicable to, as non-limiting examples, LTE/IMT-A flexible spectrum usage, generic radio systems operating in frequency bands governed by FSU rules, and local reuse of spectrum that is allocated to primary users.

As will be further shown below, the use of the exemplary embodiments of this invention provides a mechanism to manage shared use of radio spectrum between individual devices, different networks, or possibly even as a common "language" to coordinate flexible spectrum use between different radio systems. While presented at least partially in a cellular context, extensions to other types of radio systems are straightforward. Examples of such systems may include, assuming a frequency band that is allocated for free unlicensed use, but that requires adherence to FSU, a local television broadcast service and a beacon transmission in a "social networking" device that detects the presence of nearby users via radio.

Spectrum allocation (for example in an FSU system) should properly manage the use of radio resources to prevent unwanted distortion from one device causing intolerable interference at another device. Spectrum regions adjacent to a full-power transmission cannot be allocated to other radio receivers within an interference radius around the transmitter. Guard bands typically need to be reserved to prevent unwanted emissions from a transmission at high power interfering with the reception at nearby nodes.

However, transmissions at full power are comparatively rare, and a network with a high density of access points will try to avoid them altogether, since one node transmitting at full power will deny others access to the resource in a large geographical area. This is especially true in deployment scenarios such as office environments, which are among the most challenging cases for an FSU system.

As a result, it may be appreciated that spectrum that is dedicated for use as guard bands will remain unused most of the time if transmit powers are limited, and thus represents an undesirable waste of spectrum.

Figure 3:
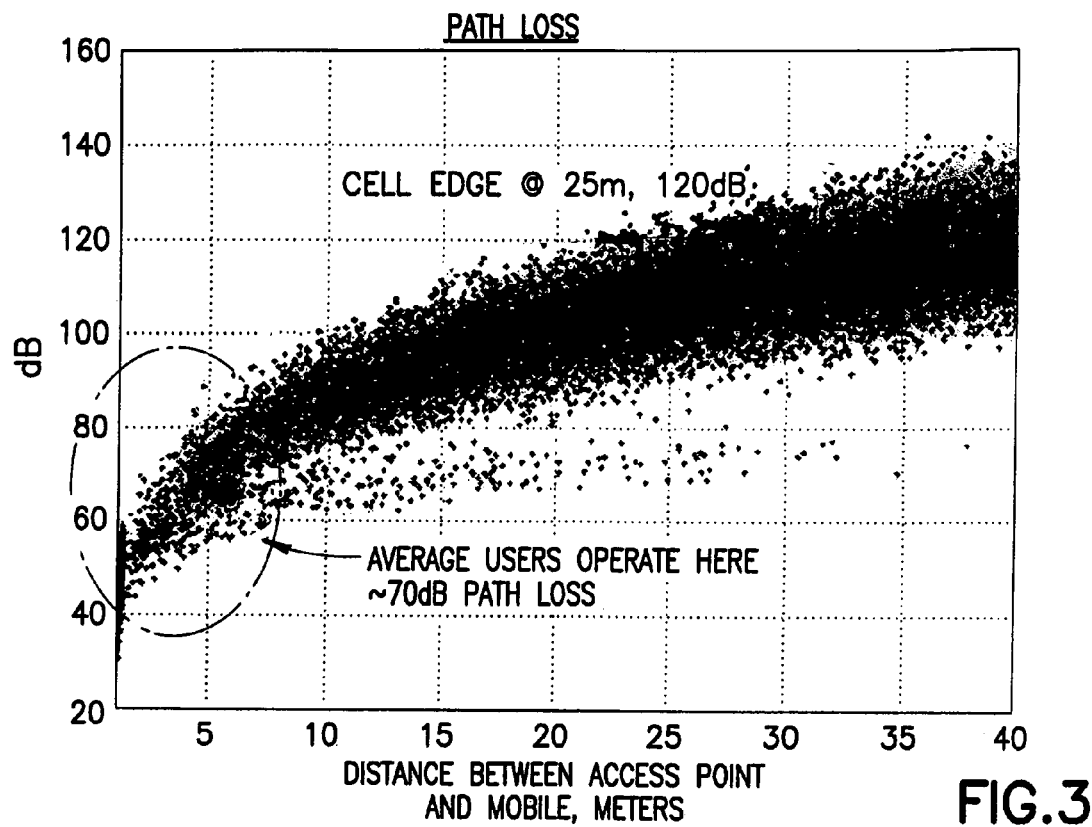
FIG. 3 shows exemplary random samples for radio path loss with shadow fading in an indoor scenario.

FIG. 3 shows random samples for a radio path loss with shadow fading in an indoor scenario. The distance between an access point (e.g., the AP 100, which may be wall or ceiling mounted) and the mobile wireless device (for example a phone or a laptop) varies, for example, between 2 meters and 25 meters (e.g., the cell edge in this non-limiting example). The system may be designed to tolerate a maximum path loss of 110 dB for cell edge users at maximum range.

While a particular device may still be functional at the cell-edge, its performance is reduced. For example, switching to a lower modulation-and-coding scheme (MCS) increases robustness to path loss, but at the expense of throughput. For example, modulation such as 64-QAM (quadrature amplitude modulation) provides greater throughput than 16-QAM or QPSK (quadrature phase shift keying), but is not as robust under noisy channel conditions.

One possible scenario for a system deployment is wireless network coverage of an office environment, connecting PCs and office infrastructure in the same way that is achieved conventionally by fixed network cabling. It is clear that the ultra-high data rates envisioned for such future systems will require a denser grid of access points. It follows that the average path loss is much lower than the maximum path loss, for example 70 dB as compared to 120 dB, and power control in the access point reduces the allocated transmit power accordingly.

Discussed now are unwanted emissions.

The signal from any radio transmitter contains a desired part (wanted or desired signal) and unwanted emissions. The majority of unwanted emissions are located in spectral regions close to the wanted signal.

Figure 4:
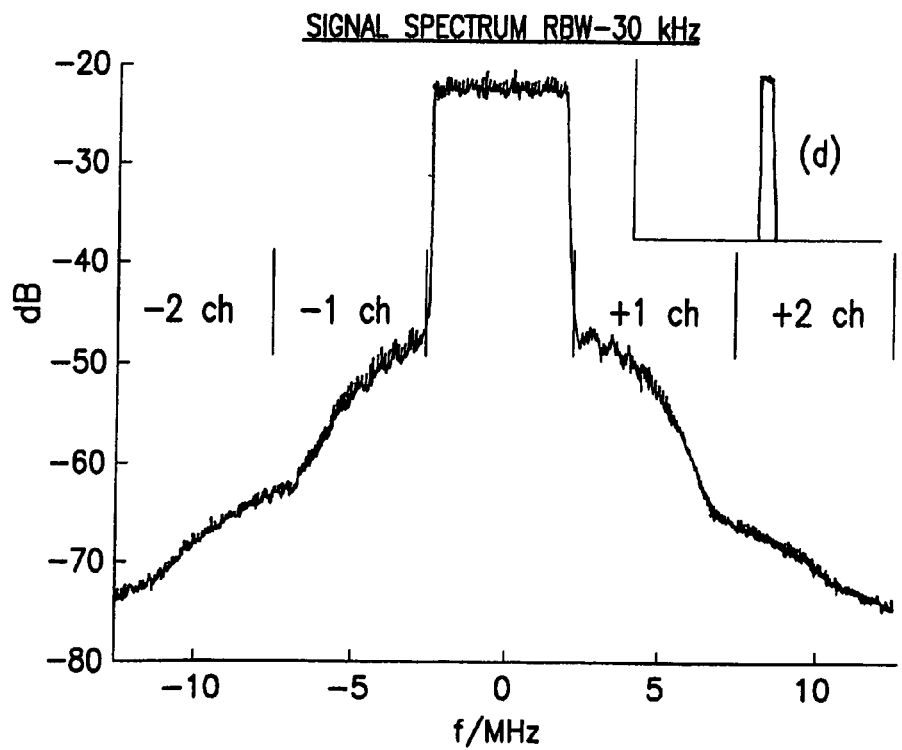
FIG. 4 presents an example of a typical emission spectrum of a mobile wireless transmitter.

FIG. 4 presents a typical emission spectrum of a mobile wireless transmitter: The frequency axis is divided into five channels, and the desired signal covers the center channel. While the ideal signal (as illustrated in the (d) inset) would be confined to one channel bandwidth, the output signal leaks energy into adjacent channels ("+1 ch/−1 ch") at a level of about −33 dBc and, to a lesser extent, into their neighbors ("alternate" channels, −2 ch/+2 ch) with −47 dBc.

With regard to interference suffered by radio receivers on adjacent channels, it makes little difference whether the signal energy is a wanted signal from a far-away transmitter, or unwanted emissions from a nearby radio. In a conventional radio system the wanted signal is strictly confined to the allocated channel, and radio energy emitted into adjacent channels serves no useful purpose.

Unwanted emissions, as visible in the adjacent channels in FIG. 4, are mainly a problem at maximum transmitter power. When backing off the total transmitted power, unwanted emissions drop faster than the wanted signal. For most of the transmit dynamic range a 1:3 relation holds (the dominant power amplifier (PA) nonlinearity is cubic), thereby obtaining a 3 dB improvement in adjacent channel emissions for a 1 dB reduction in transmit power.

Reducing the absolute level of unwanted emissions for a given transmit power may be achieved, for example, by using more power amplifiers with higher linearity (and corresponding higher cost), or by allowing higher power consumption (and corresponding reduced battery operation time in mobile devices, as well as raising cooling issues). However, these are typically fixed constraints.

As can be appreciated, there exists a need to design future systems to cope with interference in an efficient manner (interference management/coordination).

One type of spectrum emission mask is described by GB patent application 317880, to Markus Nentwig and Ilkka Urvas.

It is known, e.g., for a WiMAX application, for a transmitter to receive spectrum mask information and to adapt its linearity accordingly. This approach assumes a-priori information on the linearity of the transmitter for different settings (referring to a generic "power control block").

A further aspect of the embodiments of the present invention is an ability to estimate the spectrum of unwanted products during operation.

Another further aspect of the exemplary embodiments of the present invention is a radio transmitter that receives spectrum emission mask information from a FSU controller, such as the FSU controller 202 shown in FIG. 2, and that schedules its transmission so that all of its emissions, both wanted and unwanted, meet the constraints of the mask, and that may further estimate its own unwanted emissions (e.g., PA distortion) and perform scheduling based on the estimate. The scheduling may comprise (e.g., if one considers the non-limiting case of LTE-like systems, generally OFDM-type systems) choosing an amount of power per individual subcarrier to meet the constraints of the mask, and choosing a modulation-and-coding scheme (MCS) for each individual subcarrier (or group of subcarriers) according to an expected signal-to-noise ratio (SNR) at the receiver. The scheduling can further include optimizing the transmit power and MCS on each subcarrier, further taking into account channel estimates to each respective user device (frequency dependent scheduling).

It may be assumed that each base station (e.g., eNode-B) allocates one primary spectrum chunk. The primary chunk is more or less permanently allocated, i.e. it is not deallocated as part of an FSU scheme. In addition to the primary chunk, the base station attempts to allocate secondary chunks. Their usage is governed by FSU rules (rules set 202C), and FSU controllers 202 are assumed to be incorporated into all radios.

Before proceeding further, it will be useful to discuss the concept of primary and secondary bandwidth chunks.

In the ensuing discussion references to E-UTRAN or LTE Rel-8 are intended to relate to a communication system known as evolved UTRAN (E-UTRAN, also referred to as UTRAN-LTE or as EUTRA) that is nearing developmental completion within 3GPP. In this system the DL access technique is OFDMA, and the UL access technique is SC-FDMA. One specification of interest is 3GPP TS 36.300, V8.6.0 (2008-09), 3rd Generation Partnership Project; Technical Specification Group Radio Access Network; Evolved Universal Terrestrial Radio Access (EUTRA) and Evolved Universal Terrestrial Access Network (EUTRAN); Overall description; Stage 2 (Release 8), incorporated by reference herein in its entirety.

Figure 7:
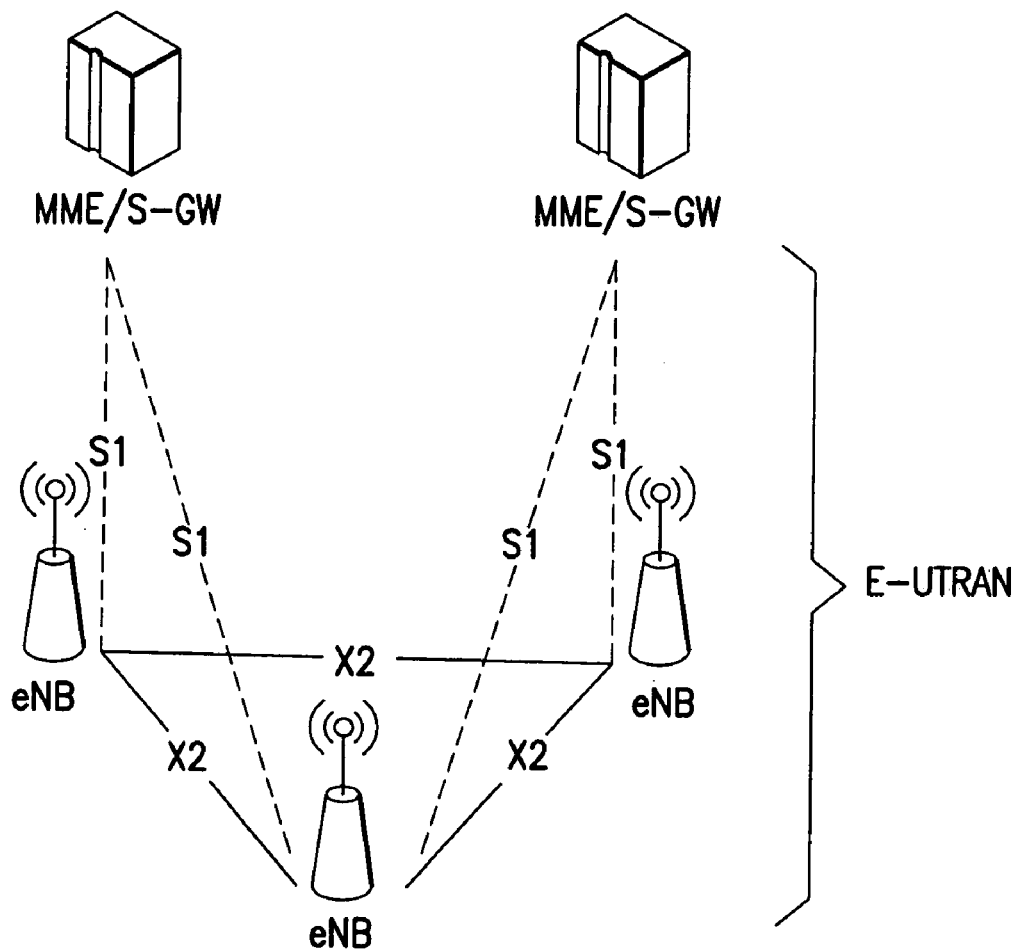
FIG. 7 reproduces FIG. 4.1 of 3GPP TS 36.300, and shows the overall architecture of the EUTRAN system.

FIG. 7 reproduces FIG. 4.1 of 3GPP TS 36.300, and shows the overall architecture of the EUTRAN system. The EUTRAN system includes eNBs, providing the EUTRA user plane (PDCP/RLC/MAC/PHY) and control plane (RRC) protocol terminations towards the UE. The eNBs are interconnected with each other by means of an X2 interface. The eNBs are also corrected by means of an S1 interface to an EPC, more specifically to a MME (Mobility Management Entity) by means of a S1 MME interface and to a Serving Gateway (S-GW) by means of a S1 interface. The S1 interface supports a many to many relationship between MMEs/Serving Gateways and eNBs.

The eNB hosts the following functions:

functions for Radio Resource Management: Radio Bearer Control, Radio Admission Control, Connection Mobility Control, Dynamic allocation of resources to UEs in both uplink and downlink (scheduling);

IP header compression and encryption of the user data stream;

selection of a MME at UE attachment;

routing of User Plane data towards Serving Gateway;

scheduling and transmission of paging messages (originated from the MME);

scheduling and transmission of broadcast information (originated from the MME or O&M); and a measurement and measurement reporting configuration for mobility and scheduling.

In general, the set of specifications given generally as 3GPP TS 36.xyz (e.g., 36.211, 36.311, 36.312, etc.) may be seen as describing the entire Rel-8 LTE system.

Also of interest herein are further releases of 3GPP Rel-8 LTE targeted towards future IMT-A systems, referred to herein for convenience simply as LTE-Advanced (LTE-A). Of additional interest herein are local area (LA) deployment scenarios using a scalable bandwidth (of up to, for example, 100 MHz) with flexible spectrum use (FSU). This system concept may be referred to herein for convenience as LTE-A.

Reference can also be made to 3GPP TR 36.913, V8.0.0 (2008-06), 3rd Generation Partnership Project; Technical Specification Group Radio Access Network; Requirements for Further Advancements for E-UTRA (LTE-Advanced) (Release 8).

Figure 5:
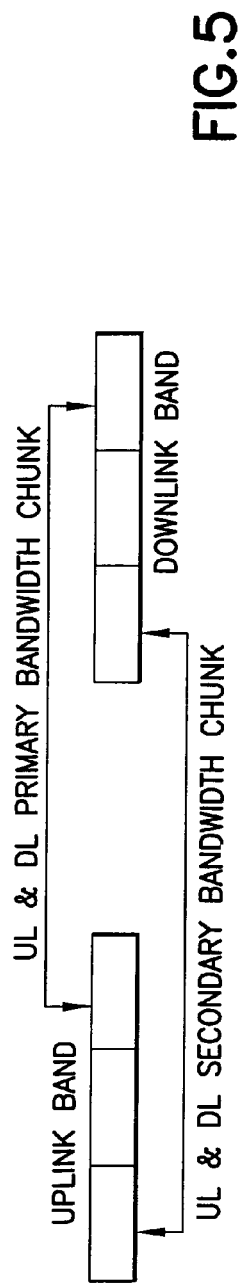
FIG. 5 is an example of a paired FDD deployment, where a primary band is the same for both UL and DL for a case of three bandwidth chunks.

It may be assumed that each eNode-B in the network selects one (and only one) primary bandwidth chunk. The primary bandwidth chunk is ideally chosen so it is possible to carry at least Rel-8 terminals (those compatible with E-UTRAN or LTE Release 8) within that particular band. The latter implies that control and common channel performance within the primary band is sufficiently good for reliable communication. The primary bandwidth chunk is assumed to provide full cell coverage, and it is assumed that UEs in the cell camp on and connect via the control channels provided in the primary frequency chunk band. In case of a paired FDD deployment, the primary band is the same for both UL and DL as illustrated in FIG. 5 for the simple case with three bandwidth chunks.

In addition to the primary band, each eNode-B may have multiple additional secondary bandwidth chunks for serving its users. The secondary bandwidth chunk may be configured to only carry LTE-A UEs, or to also carry Rel-8 UEs. Depending on the latter configuration, the secondary bandwidth chunk(s) may, or may not, be configured to have all the Rel-8 common and control channels. As an example, if a secondary bandwidth chunk is configured for LTE-A then the LTE-A users may potentially be scheduled from the PDCCH in the primary band also in the secondary band(s). Alternatively, the PDCCH for scheduling of LTE-A UEs could also be transmitted in the secondary bandwidth chunks of the cell. In highly interference limited scenarios, the secondary bandwidth chunk(s) for an eNode-B may have reduced coverage compared to the primary bandwidth chunk. Hence, for the latter case, the secondary bandwidth chunk(s) may mainly be used for serving users that are close to the eNode-B.

The primary bandwidth chunk of each eNode-B in principle is known by all the UEs in the cell, assuming this is the bandwidth chunk where UEs first connect during call setup, etc. It is therefore assumed that UEs are informed via higher layer signaling (e.g. via RRC or Sysinfo) which bandwidth chunk is the cell's primary bandwidth chunk. Alternatively, UEs may blindly detect which bandwidth chunk is the cell's primary, if the primary chunk for instance can be identified from the used synchronization sequence or scrambling code group. A Rel-8 UE need only know in which bandwidth chunk (and with which bandwidth) it is allocated. The latter is true independent of whether the Rel-8 UE is allocated in a primary or secondary bandwidth chunk. Hence, Rel-8 UEs being served in a secondary bandwidth chunk do not necessarily need any knowledge related to the primary bandwidth chunk once in the RRC connected mode (e.g., having a packet call established). LTE-A UEs being scheduled in both the primary and secondary bandwidth chunks do not necessarily need to know which chunks are selected for the secondary at the cell if the user is scheduled from the PDCCH in the primary-chunk. But, an LTE-A UE, as a minimum, needs to know in which band (bands) it has to listen to control and common channels. However, it could be beneficial to have also. LTE-A UEs informed (e.g. via higher layer signaling) of the cells secondary bandwidth chunks, i.e. may be useful for UL sounding reference signaling (SRS) configuration, CQI configuration, etc. Given these rather simple considerations, the time-scale for selecting a new primary and secondary bandwidth chunks per cell need not be fast. In principle, selection of the primary bandwidth chunk need only occur when the eNode-B is powered on, or if new eNode-Bs are powered on in close vicinity, such that reconfiguration of the primary bandwidth chunk on existing eNode-Bs is required to achieve acceptable performance (e.g. admission control and traffic type dependent QoS). Similarly, the re-configuration of the amount of secondary bandwidth chunks used by each eNode-B may also be relatively slow in order to have reasonable signaling overhead, etc. The need for re-configuring the amount of secondary bands may be primarily expected to be driven by the fluctuations of offered traffic within the cell. Thus, if the offered traffic increases, the cell starts to allocate more secondary bands, and vice versa. However, in that process, a mechanism should be provided to avoid so-called "greedy" eNode-Bs that allocate the full bandwidth, taking into consideration the traffic in neighboring cells.

In cases where an eNode-B has allocated both a primary and one or multiple secondary bandwidth chunks, it may be assumed that it first schedules traffic on the physical resource blocks (PRBs) in the primary chunk for those cases where there is insufficient offered traffic to use the PRBs in all the allocated bandwidth chunks.

As should be appreciated, the primary bandwidth chunk is comparable to the fixed spectrum allocation of current systems, where this radio resource provides channels where the base station can be reliably reached. For example, every base station broadcasts the location of the primary chunk of surrounding base stations so that the mobile device can perform measurements of signal strength, possibly leading to a handover.

FIGS. 9A, 9B, 9C and 9D reproduce FIGS. 1, 2, 3 and 4, respectively, of GB317880, and are useful for explaining the concept of a spectrum emission mask.

Figure 9A:
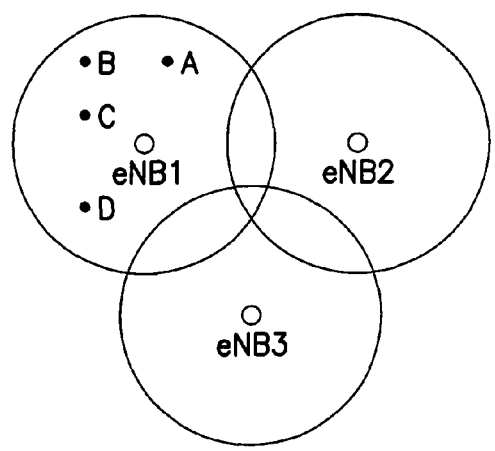
FIGS. 9A, 9B, 9C and 9D reproduce FIGS. 1, 2, 3 and 4, respectively, of GB317880, and are useful for explaining the concept of a spectrum emission mask.

With reference to FIG. 9A, mobile device A is in radio communication with a base station (eNB), which is also in simultaneous radio communication with a further mobile devices S, C and D.

Figure 9B:
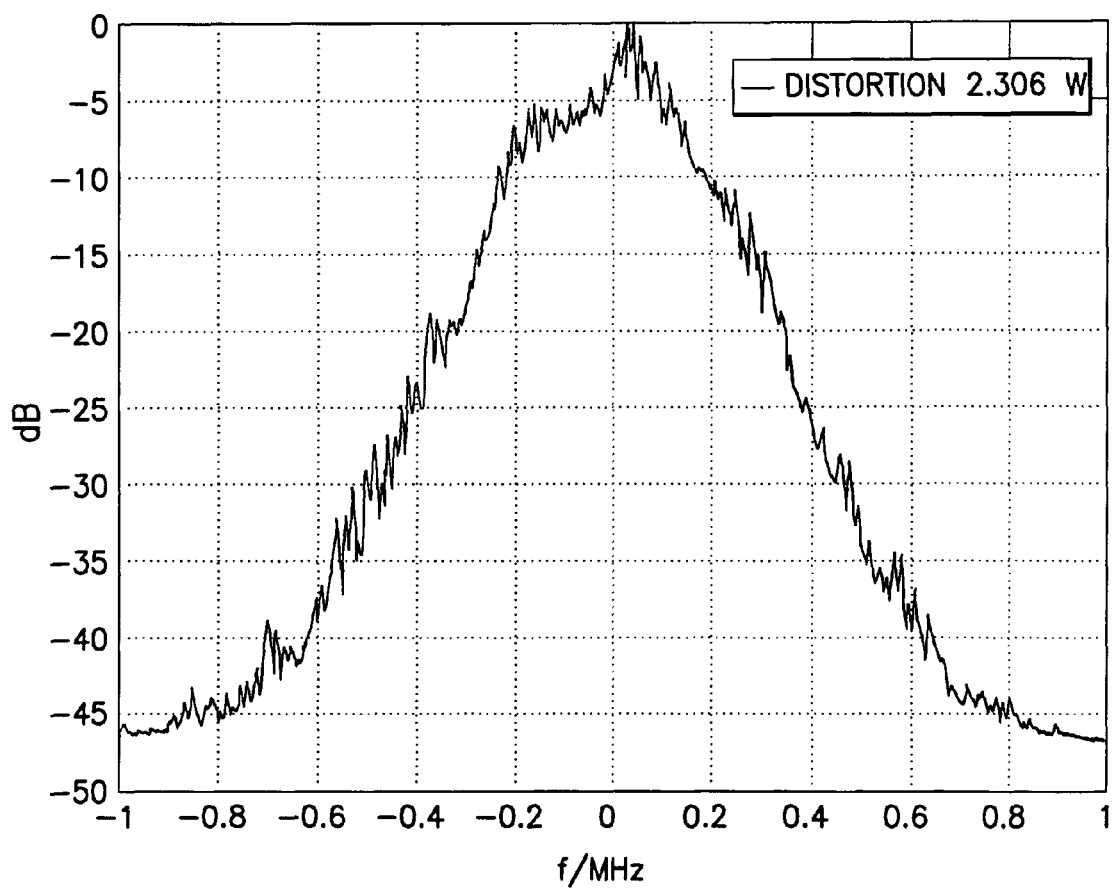

The transmitter nonlinearity for mobile device A may be is modeled as AMAM/AMPM lookup table. AMAM (amplitude-to-amplitude modulation) is a distortion mechanism in power amplifiers and transmitters. AMPM (Amplitude-to-phase modulation) is another distortion mechanism. The model produces an estimate of only the distortion signal (i.e. excluding the linear term), as shown in FIG. 9B. The model may be determined by mobile device A using a signal loop-back technique, in which mobile device A transmits a signal at a particular frequency and receives its own transmitted signal using its own receiver tuned to the frequency of transmission. Such a loopback technique can be implemented in a time-domain multiplexed system during idle periods of the receiver, or using a 2nd (diversity or MIMO) receiver branch; as non-limiting examples.

Alternatively, some data, for example, spectral emission estimates for a given transmitter configuration could be pre-computed and stored at the mobile device A.

Figure 9C:
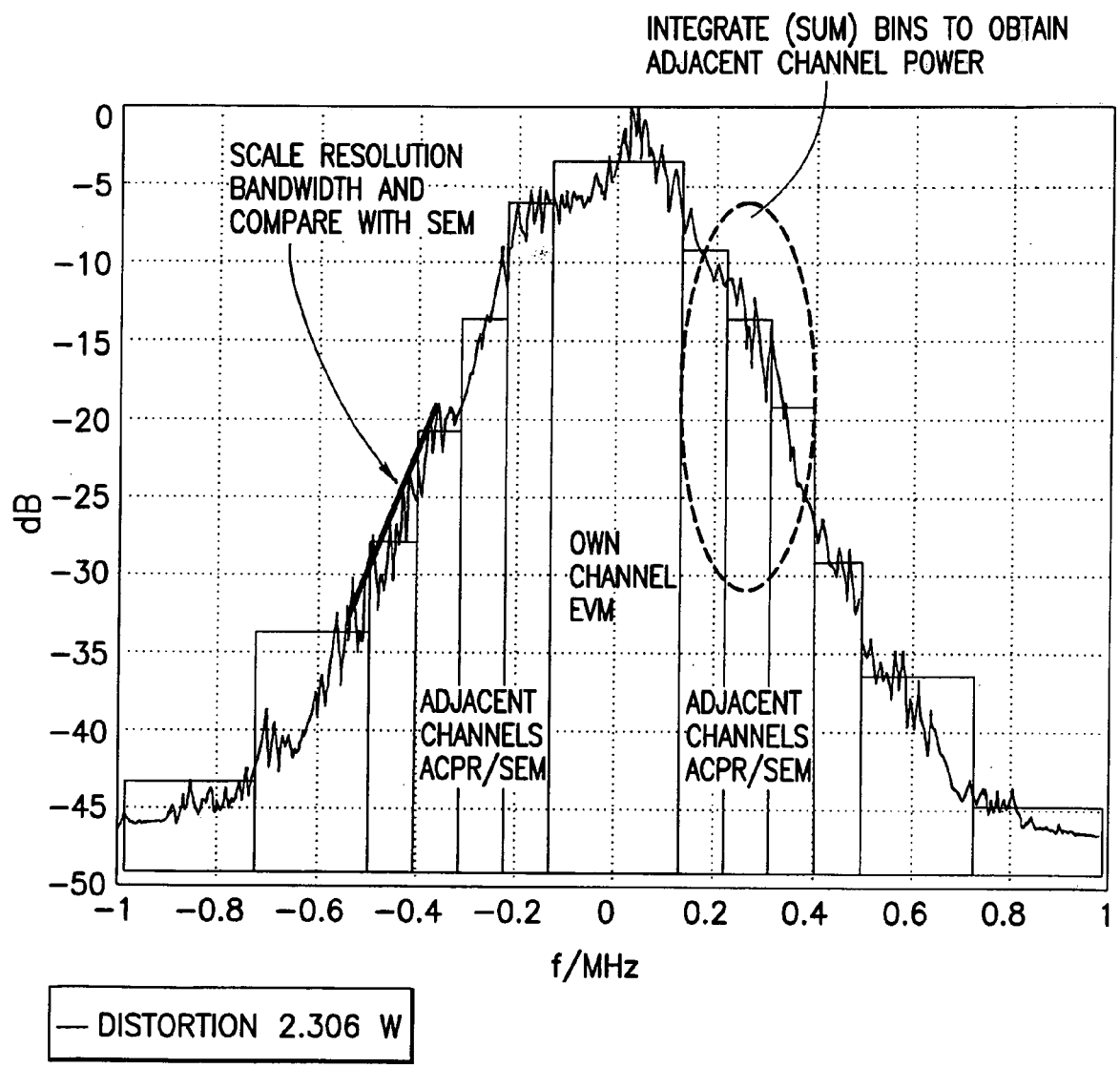

Mobile device A processes the distortion model data to produce a distortion power level for each of a number of frequency bins (frequency divisions). This is shown in FIG. 9C as a histogram of distortion power against frequency.

The in-band bins are frequency bins in which signal distortion can affect error vector magnitude of the received signal at the base station, and the out-of-band bins are frequency bins in which the level of distortion determines adjacent channel power ratios and are relevant with regard to spectral emission constraints.

The identity (e.g., width and number) of the frequency bins can be chosen as needed. For example, they could be chosen according to instructions from radio resource managing entity of the access network. The radio managing resource entity could be part of the base station (eNB), or it could be a separate entity within the access network. For example, in some access networks there may be no need for a detailed breakdown of unwanted emissions in the own channel bandwidth, but a higher resolution in adjacent channels may be beneficial. Some radio systems, e.g., IS-95, have a channel raster that is much smaller than the bandwidth. In this case, radio resource management for an access network operating in accordance with such a system may require high resolution information for distortion levels at outer frequencies, and make a decision on the basis of such information as to what is the optimum frequency spacing between different transmitters to achieve a good balance between interference and capacity (total number of channels).

This is also useful for E-UTRAN, where there is the possibility to leave resource blocks (frequency regions) between two transmitters unoccupied.

Alternatively, the identity of the frequency bins used to communicate unwanted emission levels may be predetermined, for example by the specifications of the radio protocol.

Note that in the exemplary embodiments of this invention the radio managing resource entity may be embodied at least partially by the FSU controller 202 shown in FIG. 2.

Mobile device A sends the signal distortion information represented by the histogram of FIG. 9B to the access network via the wireless interface between mobile device A and the base station (eNB). Mobile device A thus communicates its current estimate of the distortion spectrum to the radio resource managing entity of the radio access network, which as discussed below is taken into account by the radio resource managing entity when making a decision as to what level of signal quality requirements to apply to a transmission from mobile device A.

Mobile device A may also communicate capability and limit information to the radio resource managing entity in other forms. For example, mobile device A may present to the radio resource managing entity a choice of different possible trade-offs between the spectrum of unwanted emissions, transmit power and power consumption.

The access network determines a set of signal quality requirements for a data transmission between mobile device A and the base station (eNB), based on the signal distortion information received from mobile device A and/or on corresponding signal distortion information received from mobile devices B, C and D.

Examples of how the radio resource managing entity might function on the basis of signal distortion information received from mobiles devices A, B, C and D include the following:

1. Relax the linearity requirement for mobile devices for which the signal distortion information indicates the use of low-performance hardware (for example older generations of mobile devices), in order to maximize the average battery life time of all mobile devices. Alternatively, the radio resource management algorithm might be configured to enforce equal spectral emission requirements on all mobile devices to discourage use of obsolete and inefficient hardware.

2. Identify from the signal distortion information mobile devices that need to produce more adjacent channel emissions than others, and select transmission frequencies for any such mobile device around frequencies that are intentionally left unused or that are known to be capable of tolerating higher levels of interference.

3. Temporarily increase the linearity requirement for a mobile device whose transmitter emissions overlap a neighboring channel that is in a deep fade (i.e. is suffering from strong destructive interference that might result in temporary failure of communication due to a severe drop in the channel signal-to-noise ratio).

4. Reduce the linearity requirements in areas where the network is only lightly loaded, allowing higher out-of-band emissions leading to longer battery operation time at the mobile devices, and enforce more stringent requirements in areas with heavy load to increase overall throughput at the expense of power efficiency.

The radio resource managing entity of the access network transmits to mobile device A (via the wireless interface between mobile device A and the base station (eNB)) information of the signal quality requirements in respect of one or more of in-band emission power level, error vector magnitude (EVM), adjacent channel power ratio (ACPR) and spectral emission mask (SEM). For example, the information might comprise information of a respective maximum distortion level in each of a plurality of frequency bins, as can be graphically represented by a histogram of the type shown in FIG. 9C.

The access network may thus dynamically update the signal quality requirements for the mobile device as part of radio resource management.

Mobile device A then sets its transmitter so as to minimize battery current consumption whilst meeting the quality requirements specified in the message from the access network. This may involve, for example, one or more of: (i) controlling the supply voltage of the power amplifier directly or indirectly (for example through changing envelope tracking parameters); (ii) controlling the supply current of the PA (bias point); (iii) controlling predistortion settings and signal clipping to shape the spectrum of unwanted emissions according to the requirements; and (iv) controlling the load presented to the power amplifier.

For example, predistortion coefficients can be adapted, for example, by switching to soft clipping to move the majority of distortion products into the own channel (i.e., decrease the level of distortion at frequencies overlapping a neighboring channel at the expense of increased distortion in the transmitter's own channel), when a neighboring channel is very weak and the EVM requirements for the transmitter's own channel are relatively low).

As was mentioned above, power amplifier linearity is related to current consumption. Operating the mobile transmitter with no more than the minimum linearity that meets the requirements at the time in question (as determined by the access network) will result in longer operation/talk time for a given battery capacity.

Figure 9D:
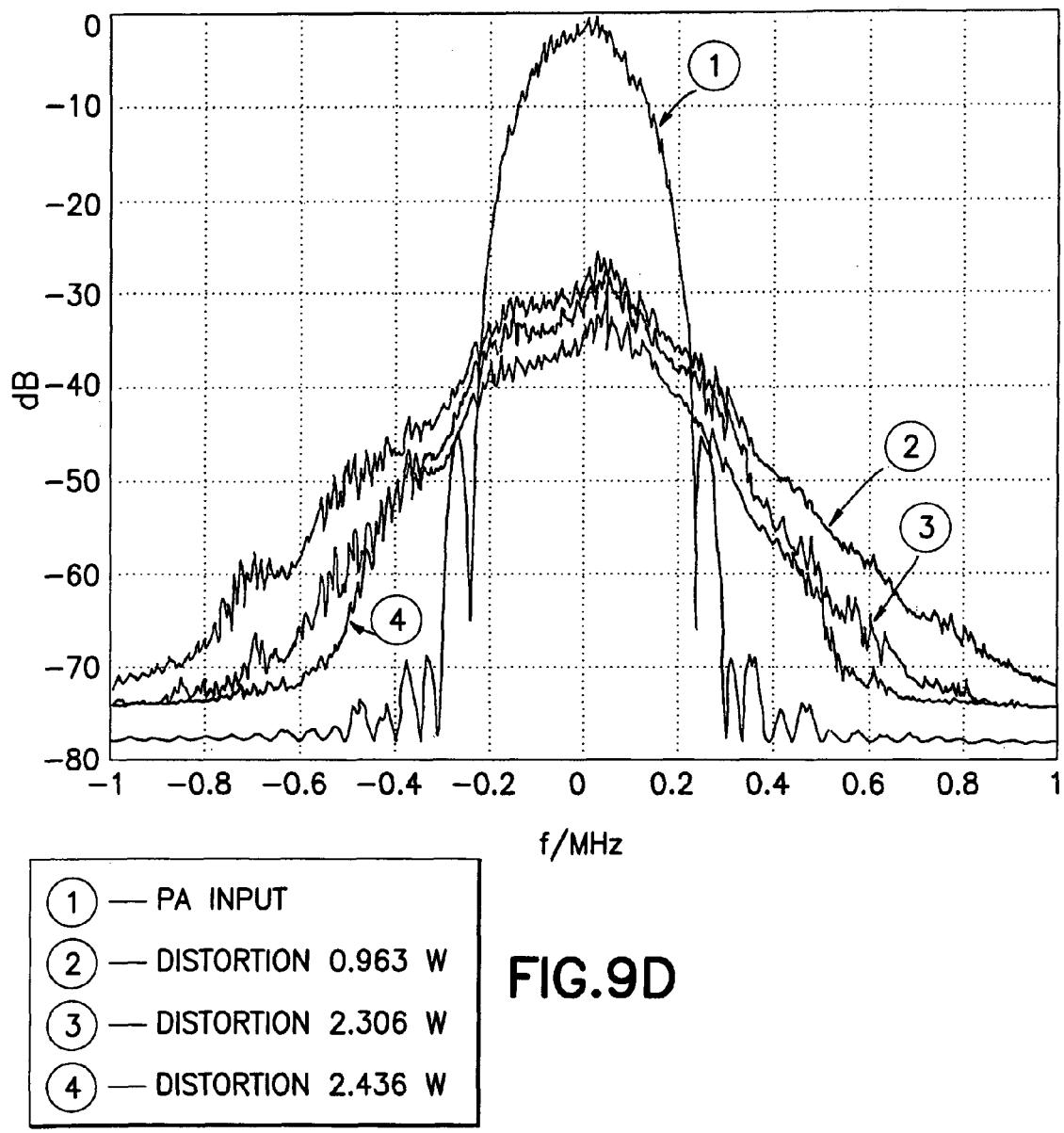

FIG. 9D illustrates how making a small reduction in signal quality (PA linearity) can have a significant beneficial effect on power consumption. FIG. 9D shows the ideal spectrum ("PA input") and the resulting distortion products at three different bias points of the power amplifier. The in-band distortion products (within ±200 kHz) appear as error vector magnitude of the own transmitted signal, the out-of-band products deteriorate the performance of adjacent channels. The power consumption of the PA is shown together with the trace (RF power: 26 dBm or −0.4 W). In this, particular example, a change in signal quality requirements of −8 dB (EVM and/or ACPR) increases the PA power consumption by about 250%.

Figure 6:
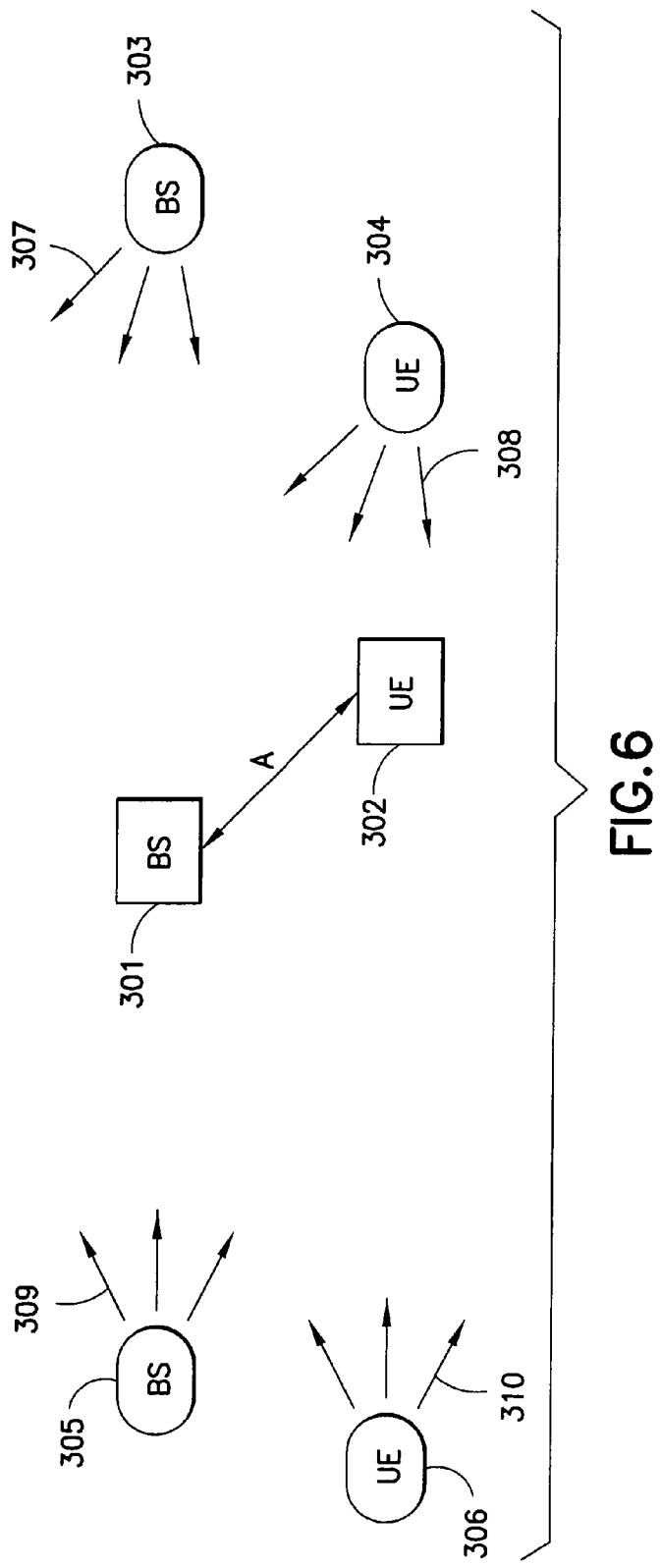
FIG. 6 shows nodes in a radio system that operate nearby and possibly share radio resources using a FSU mechanism.

Having thus given an overview of the concept of the spectrum emission mask, reference is now made to FIG. 6 for showing a plurality of nodes in a radio system, where the nodes operate nearby and possibly share radio resources using FSU mechanisms. In FIG. 6 base station (BS) 301 and mobile device (UE) 302 belong to one network, base station 303 and the mobile device 304 belong to a second network, and devices 365/306 to a third network.

Here it is assumed that the different networks have no connection through the network backbone. Therefore, radio resource use needs to be negotiated through the air interface. From an LTE perspective such an uncoordinated scenario might be considered a "worst case". However, for radio systems operating in unlicensed bands (WLAN), it is the norm.

Assume that BS 301 intends to set up a high data rate transmission to UE 302 and thus attempts to allocate additional radio resources that are at least partly in use by BSs and UEs 303-306. With regard to the discussion above, those resources may be comparable to "secondary chunks".

Assume further that the frequency band is governed by the FSU controller rules set 202C, enforcing fair and efficient sharing of the radio resource. In a further assumption the rules that form a part of the rules set 202C are constructed in accordance with at least two basic principles:

(1) Every receiver may periodically broadcast beacon information, indicating the FSU resources used for reception that are sensitive to interference. In FIG. 6 those broadcasts relevant in this example are indicated by arrows 307-310.

(2) Every device is required to determine a maximum transmit power level per FSU resource that causes no intolerable interference to other receivers.

The maximum transmit power level may be determined by a particular one of the devices from (i) the received beacons of nearby devices, (ii) a known sensitivity level and (iii) a known power with which the received beacon was transmitted. The latter two items (ii) and (iii) enable the device to estimate the path loss between itself and the device that transmitted the beacon.

When radio resources start to become scarce due to overuse, the FSU rules set 202C include mechanisms to limit the allowed resource allocation to every radio. One possible signaling scheme is disclosed in PCT/IB2008/052438, Method and Apparatus for Flexible Spectrum Usage in Communications Systems, M. Nentwig and P. Jänis.

The BS 301 receives the beacons from surrounding radios. Based on the power level of received beacons 307-310, the BS 301 determines that devices 303-306 are within range, and may potentially cause interference.

Using the received power level of beacons 307-310 and information descriptive of the beacon's transmit power (that may be encoded in the beacon data), BS 301 estimates the path loss to the transmitter of the beacon. Based on a sensitivity level (possibly also encoded in the beacon), BS 301 determines a maximum power for each radio resource transmitted by it that will not cause an intolerable interference. In combination with other emission requirements from the applicable radio standard, a spectrum emission mask results, corresponding to the mask that may be generated by the FSU controller 202.

The BS 301 then allocates data streams to different frequency regions so that the total emissions remain below the generated spectral emission mask. The BS 301 may also estimate the expected SNR of each frequency region (such as a resource block) at the receiver, and assigns modulation-and-coding schemes for the transmitted data streams to so as to maximize the total throughput.

With regard to item (1) above, it was said that every receiver may periodically broadcast beacon information, indicating the FSU resources used for reception that are sensitive to interference. Note that in some instances, such as, one based on a battery power consideration, the receiver may broadcast the beacon only as needed.

Further in accordance with this invention, the beacon may also convey the resource unit (allocation unit) auction-related information for enabling the bidding process to occur as described above. The auction-related information can comprise the actual bid (in CUs), as well as the time-related information (delta time) indicating the interval of time that a particular resource is owned by the node, or a time at which the node intends to take control of the resource if its associated bid is successful.

In general, at least in a lightly loaded radio environment, a mobile receiver may be allowed to not transmit a beacon indicating a reservation for reception. Instead, it may listen for incoming bids. If a bid is detected it transmits the beacon for informing the bidder that a reservation exists for forcing the bidder to withdraw the bid, or change the validity time to the expiry time of the reservation.

The use of these exemplary embodiments of the invention may provide significant capacity improvements in a radio system where the cell size covered by one access point can vary, such as in a case where cell size adaptation is a part of FSU dynamics. The use of these exemplary embodiments enables the establishment of a common radio protocol for FSU in present and future unlicensed bands, where only radio devices supporting the protocol may be allowed to operate in the band. In order to be allowed to transmit, a radio is required to listen to requests from nearby devices. Such a request is made at least to negotiate radio resources between the devices. In general, a particular device may use an uncontested radio resource freely, while a contested radio resource is shared in accordance with predefined rules that implement fair and efficient sharing. The rules of the rules set 202C may be seen to implement a micro-economy system wherein the greater the demand the smaller is the "fair share" of resources for each device. Devices are enabled to trade off parameters, such as power, bandwidth, throughput, reservation time and so forth within a predetermined budget.

The overall power range considered may be comparable to that used in current WLAN systems (e.g., 20-30 dBm), although this is not a limitation on the practice of this invention.

There is also provided fair treatment of both omnidirectional and directional antennas, by the amount of interference they generate.

The exemplary embodiments of this invention thus clearly relate to the improvement of radio resource utilization, such as in those scenarios where spectral (radio) resources, especially in fixed and licensed radio allocations, are not fully utilized. By the use of these exemplary embodiments it is possible to transfer more data or otherwise improve the quality of service with more control and flexibility to the spectral emission limits for transmission.

The exemplary embodiments of this invention also clearly relate to the improvement of radio resource utilization in unlicensed radio allocations.

Certain aspects of these exemplary embodiments provide flexible spectrum use rules and implement a control entity (the FSU controller 202 of FIG. 2) to the radio system. A radio in the FSU-enabled radio system requests transmission permission, and the FSU controller 202 grants a spectrum emission mask for it depending on the current traffic conditions.

A radio transmitter in the FSU-enabled radio system includes means to estimate the amount of spectral emissions it creates with given parameters, such as the modulation-and-coding scheme, transmission power and bandwidth.

The exemplary embodiments in one aspect thereof provide a set of rules 202C to implement "spectrum etiquette" for the interaction between devices, when the devices negotiate use of shared radio resources. Once the devices reach an agreement each FSU controller 202 knows how much power it is allowed to transmit per resource or allocation unit (e.g., per frequency slice). This information is then provided to the radio (e.g., to the radio interface 201), such as in the form of a vector of power-vs-frequency values.

An aspect of these exemplary embodiments of this invention is the provision of the rules set 202C, which may be seen to be analogous to traffic rules that adapt to the amount of traffic. This common rules set 202C, in cooperation with the communication between respective FSU controllers 202, provides a framework allowing the interaction between devices to be constrained by the common rules set so as to achieve fairness of resource sharing. Additionally, the exemplary embodiments of this invention provide a physical layer scheme that takes advantage of the rules set to utilize the spectrum more efficiently.

The FSU controllers 202 communicate with one another using a common protocol that, whatever its nature, obeys the predetermined and common rules set 202C.

Further in accordance with these exemplary embodiments of the invention, and given the above vector of power-vs-frequency values, i.e., the spectrum or power mask, the transmitter estimates the SNR in each frequency chunk/resource unit at the receiver, selects an appropriate modulation-and-coding scheme (MCS) per resource, and schedules transmission on each resource using the MCS scheme selected for each resource. The technique uses a variable power mask, and the transmitter is free to fill the power mask with any kind of signal, including distortion. For example, if additional bandwidth/power budget is available, the transmitter may operate with a reduced linearity to improve the battery life time. That is, the transmitter estimates its power amplifier distortion and adjusts input power to the power amplifier.

It should be understood that the underlying FSU scheme may have a number of different implementations, and should not be considered to be limited in any respect to only the FSU techniques discussed above. In general, it may be most desirable that the grant to transmit is based on the spectrum mask.

With further regard to FSU schemes, note that one may begin with an existing cellular network (e.g., a "legacy" LTE network) in a different frequency band. This provides the "control plane" for FSU negotiations. Into each LTE cell one may then add a FSU server that coordinates the negotiations between FSU nodes. Nodes sense each other's presence (e.g., APs possibly remotely via their UEs), and report their findings to the FSU server. A desired end result is that every node obtains an associated emission mask that is assigned by the FSU server. Effectively, a FSU server is associated with a cell and acts as a FSU controller for the entire cell.

In another exemplary embodiment the FSU server in each cell may be eliminated. In this case the nodes sense each other, and then contact the other node directly through the legacy (e.g., cellular) network. A negotiation process may then follow between nodes, resulting in the assignment of the spectrum emission masks to the various participating nodes.

In a still further exemplary embodiment the auction-based-scheme via signaling (e.g., via beaconing) may be used, as described above in reference to FIGS. 1 and 2.

A common denominator of the various exemplary possible approaches is the use of the spectrum emission mask for each participating node.

The spectrum emission mask-based wireless communication system may be implemented such that transmitters include means to estimate their "spectrum consumption" using knowledge of the modulation-and-coding scheme (MCS), power per individual subcarrier, power amplifier characteristics, bandwidth, and so forth.

An aspect of these exemplary embodiments of the invention is providing or allocating one spectrum emission mask to the transmitter that encompasses both wanted (desirable) and unwanted (undesirable) emissions. In response, the transmitter may choose freely (taking into account its own distortion characteristics, the channel, a SNR estimate at the receiver, and so forth) where to allocate the signal energy. The goal is maintain the sum of both the wanted and the unwanted emissions below the limits imposed by the spectrum emission mask.

Based on the foregoing it should be apparent that the exemplary embodiments of this invention provide a method, apparatus and computer program(s) to operate a radio device in a flexible spectrum use system so as to achieve fairness of resource use and optimal throughput depending on radio conditions, including the presence of interference.

Figure 8:
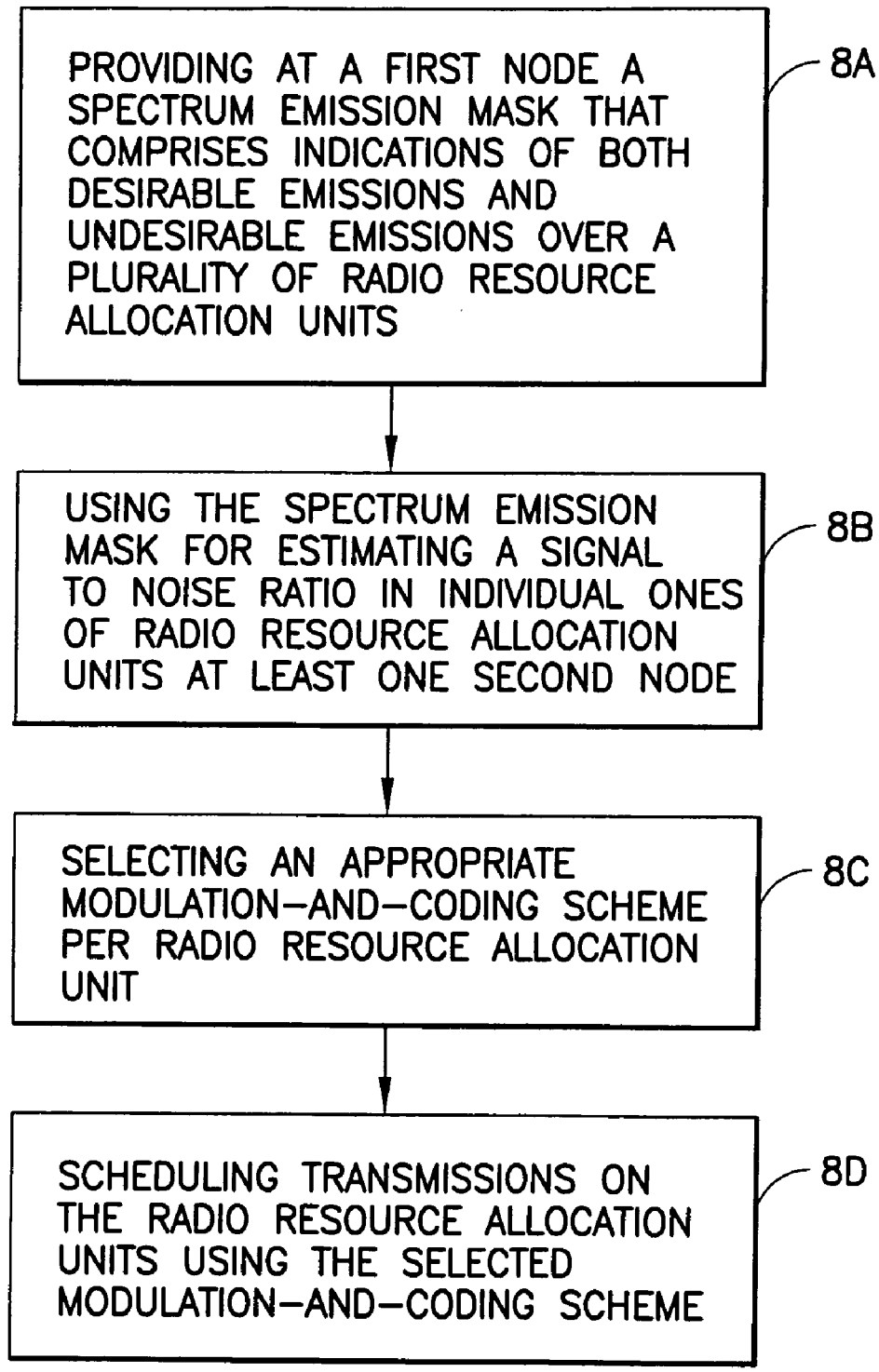
FIG. 8 is a logic flow diagram that illustrates the operation of a method, and a result of execution of computer program instructions embodied on a computer readable memory, in accordance with the exemplary embodiments of this invention.

FIG. 8 is a logic flow diagram that illustrates the operation of a method, and a result of execution of computer program instructions, in accordance with the exemplary embodiments of this invention. In accordance with these exemplary embodiments a method performs, at Block 8A, a step of a providing at a first node a spectrum emission mask that comprises indications of both desirable emissions and undesirable emissions over a plurality of radio resource allocation units. At Block 8B there is a step of using the spectrum emission mask for estimating a signal to noise ratio in individual ones of radio resource allocation units at at least one second node. At Block 8C there is a step of selecting an appropriate modulation-and-coding scheme per radio resource allocation unit. At Block 8D there is a step of scheduling transmissions on the radio resource allocation units using the selected modulation-and-coding scheme.

The various blocks shown in FIG. 8 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while described above primarily in the context of the radio resources being shared in the frequency domain, the radio resources may also be shared in the time domain. This can be straightforward, such as by dividing the radio resources into a two dimensional grid of frequency and time slices, such as in the "resource blocks" of LTE, but with wider bandwidth. Time division sharing enables the use of a finer resource granularity in a highly loaded network on the same frequency grid (which may be determined at least in part by a desire to maintain backwards compatibility with LTE Rel-9 and possibly later releases). Transmissions may also be enabled to be scheduled more efficiently with respect to unwanted out-of-band emission considerations. Reference in this regard may be made to PCT/IB2008/052438, by Markus Nentwig and Pekka Jänis, which describes a time-division scheme for radio resource sharing. This publication also provides a technique for detecting a presence of other FSU-enabled radios and recovering frame-level synchronization information, without the need for synchronizing the receiver to the transmitter. A still further embodiment of this invention encompasses a combination of frequency domain sharing as described above with time division multiplexing, such as time division multiplexing as described in PCT/IB2008/052438.

As a further example, while the exemplary embodiments have been described above at least partially in the context of the EUTRAN (UTRAN-LTE) and LTE-A systems, it should be appreciated that the exemplary embodiments of this invention are not limited for use with only this one particular type of wireless communication system, and that they may be used to advantage in other wireless communication systems such as for example WLAN and any type of system that utilizes licensed and unlicensed spectrum.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., CU, etc.) are not intended to be limiting in any respect, as these parameters may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
    providing at a first node a spectrum emission mask that comprises indications of both desirable emissions and undesirable emissions over a plurality of radio resource allocation units;
    using the spectrum emission mask for estimating a signal to noise ratio in individual ones of radio resource allocation units at at least one second node;
    selecting an appropriate modulation-and-coding scheme per radio resource allocation unit; and
    scheduling transmissions on the radio resource allocation units using the selected modulation-and-coding schemes; the method further comprising,
    receiving a beacon transmission from a second node, the beacon transmission indicating a receiver sensitivity of the second node,
    estimating a path loss to the second node that transmitted the beacon in accordance with knowledge of a transmission power with which the beacon was transmitted, and
    further comprising the first node taking into account at least its own distortion characteristics, the estimated path loss and the estimated signal to noise ratio, allocating transmit signal energy such that a sum of the desirable emissions and the undesirable emissions is less than limits imposed by the spectrum emission mask.

2. The method of claim 1, where the spectrum emission mask is comprised of a vector of power versus frequency values.

3. The method of claim 1, where the spectrum emission mask covers at least one frequency chunk of a cellular wireless communication system that operates in accordance with an orthogonal frequency division multiple access scheme.

4. The method of claim 1, where the spectrum emission mask is provided from a flexible spectrum use controller associated with a cell in which the first node is operating.

5. The method of claim 1, where the spectrum emission mask is provided as a result of a negotiation process between the first node and the at least one second node, where the negotiation process occurs over at least one frequency band of a wireless communication network.

6. The method of claim 1, where the spectrum emission mask is provided as a result of an auction process between the first node and the at least one second node, where the auction process occurs using broadcast beacon transmissions between participating nodes.

7. The method of claim 1, further comprising:
    establishing temporary ownership of a radio resource allocation unit through an auction process conducted between the first node and the at least one second node using broadcast beacon transmissions; and
    for a node that is successful in establishing temporary ownership of the radio resource allocation unit, at least one of transmitting and receiving data over the radio resource allocation unit for a limited period of time.

8. The method of claim 7, further comprising conducting the auction process to obtain ownership of a particular radio resource allocation unit at some specified future time.

9. The method as in claim 7, where during the auction process participating nodes bid credit units, where an auction strategy is based on a common rules set comprising at least some of the following rules:
    credit units are accumulated over time by each node;
    credit units are accumulated up to a limit;
    credit units are consumed when using a radio resource allocation unit;
    if only one node contends for a particular radio resource allocation unit, the cost of that particular radio resource allocation unit in credit units is less than the cost of another radio resource allocation unit for which two or more nodes contend; and
    a node that has temporary ownership of a particular radio resource allocation unit indicates in a broadcast beacon the price in credit units that it has paid, for enabling other nodes to determine that the particular radio resource allocation unit is in use.

10. The method as in claim 9, where the common rules set further comprises at least some of the following rules:
    credit units may be passed from a node to another node;
    the limit on the number of accumulated credit units for a node that serves other nodes increases in proportion to the number of other nodes that are served; and
    the cost of a radio resource allocation unit is proportional to an area, over which a reservation of the radio resource denies it to other users.

11. The method as in claim 1, executed in a flexible spectrum use system.

12. The method of claim 11, where the spectrum is unlicensed spectrum.

13. A non-transitory computer-readable memory medium that stores program instructions, the execution of the program instructions resulting in operations that comprise:
    responsive to a spectrum emission mask that comprises indications of both desirable emissions and undesirable emissions over a plurality of radio resource allocation units, using at a first node the spectrum emission mask for estimating a signal to noise ratio in individual ones of radio resource allocation units at at least one second node;

selecting an appropriate modulation-and-coding scheme per radio resource allocation unit; and scheduling transmissions on the radio resource allocation units using the selected modulation-and-coding schemes; further comprising operations of receiving a beacon transmission from a second node, the beacon transmission indicating a receiver sensitivity of the second node;

estimating a path loss to the second node that transmitted the beacon in accordance with knowledge of a transmission power with which the beacon was transmitted; and taking into account at least own distortion characteristics of the first node, the estimated path loss and the estimated signal to noise ratio, allocating transmit signal energy such that a sum of the desirable emissions and the undesirable emissions is less than limits imposed by the spectrum emission mask.

14. The computer-readable memory medium of claim 13, where the spectrum emission mask is comprised of a vector of power versus frequency values and is provided from one of a flexible spectrum use controller associated with a cell in which the first node is operating, a result of a negotiation process between the first node and the at least one second node, where the negotiation process occurs over at least one frequency band of a wireless communication network, or as a result of an auction process between the first node and the at least one second node, where the auction process occurs using broadcast beacon transmissions between participating nodes.

15. The computer-readable memory medium of claim 13, where the spectrum emission mask is comprised of a vector of power versus frequency values that cover at least one frequency chunk of a cellular wireless communication system that operates in accordance with an orthogonal frequency division multiple access scheme.

16. The computer-readable memory medium of claim 13, further comprising operations of:

establishing temporary ownership of a radio resource allocation unit through an auction process conducted between the first node and the at least one second node using broadcast beacon transmissions; and at least one of transmitting and receiving data over the radio resource allocation unit for a limited period of time, where during the auction process participating nodes bid credit units, where an auction strategy is based on a common rules set comprising at least some of the following rules:

credit units are accumulated over time by each node;
credit units are accumulated up to a limit;
credit units are consumed when using a radio resource allocation unit;
if only one node contends for a particular radio resource allocation unit, the cost of that particular radio resource allocation unit in credit units is less than the cost of another radio resource allocation unit for which two or more nodes contend; and
a node that has temporary ownership of a particular radio resource allocation unit indicates in a broadcast beacon the price in credit units that it has paid, for enabling other nodes to determine that the particular radio resource allocation unit is in use.

17. The computer-readable memory medium of claim 16, where the common rules set further comprises at least some of the following rules:

credit units may be passed from a node to another node;
the limit on the number of accumulated credit units for a node that serves other nodes increases in proportion to the number of other nodes that are served; and
the cost of a radio resource allocation unit is proportional to an area, over which a reservation of the radio resource denies it to other users.

18. The computer-readable memory medium of claim 16, further comprising conducting the auction process to obtain ownership of a particular radio resource allocation unit at some specified future time.

19. The computer-readable memory medium of claim 13, embodied in an apparatus of a flexible spectrum use system.

20. The computer-readable memory medium of claim 19, where the spectrum is comprised of unlicensed spectrum.

21. An apparatus, comprising:

a controller configured to be coupled with a radio interface of a first wireless network node, said controller further configured to respond to a spectrum emission mask that comprises indications of both desirable emissions and undesirable emissions over a plurality of radio resource allocation units and to estimate a signal to noise ratio in individual ones of radio resource allocation units at at least one second node, to select an appropriate modulation-and-coding scheme per radio resource allocation unit and to schedule transmissions for the radio interface on the radio resource allocation units using the selected modulation-and-coding schemes, said controller being further configured to receive via said radio interface a beacon transmission from a second node, the beacon transmission indicating a receiver sensitivity of the second node and to estimate a path loss to the second node that transmitted the beacon in accordance with knowledge of a transmission power with which the beacon was transmitted, said controller further configured to consider distortion characteristics associated with the radio interface, the estimated path loss and the estimated signal to noise ratio so as to allocate transmit signal energy such that a sum of the desirable emissions and the undesirable emissions is less than limits imposed by the spectrum emission mask.

22. The apparatus of claim 21, where the spectrum emission mask is comprised of a vector of power versus frequency values and is provided from one of a flexible spectrum use controller associated with a cell in which the first node is operating, a result of a negotiation process between the first node and the at least one second node, where the negotiation process occurs over at least one frequency band of a wireless communication network, or as a result of an auction process between the first node and the at least one second node, where the auction process occurs using broadcast beacon transmissions between participating nodes.

23. The apparatus of claim 21, where the spectrum emission mask is comprised of a vector of power versus frequency values that cover at least one frequency chunk of a cellular wireless communication system that operates in accordance with an orthogonal frequency division multiple access scheme.

24. The apparatus of claim 21, said controller being further configured to establish temporary ownership of a radio resource allocation unit through an auction process conducted between the first node and the at least one second node using broadcast beacon transmissions, and to at least one of transmit and receive data over the radio resource allocation unit for a limited period of time, where during the auction process participating nodes bid credit units, where an auction strategy is based on a common rules set stored in a memory accessible by said controller, said common rules set comprising at least some of the following rules:

credit units are accumulated over time by each node;
credit units are accumulated up to a limit;

credit units are consumed when using a radio resource allocation unit;

if only one node contends for a particular radio resource allocation unit, the cost of that particular radio resource allocation unit in credit units is less than the cost of another radio resource allocation unit for which two or more nodes contend; and a node that has temporary ownership of a particular radio resource allocation unit indicates in a broadcast beacon the price in credit units that it has paid, for enabling other nodes to determine that the particular radio resource allocation unit is in use.

25. The apparatus of claim 24, where the common rules set further comprises at least some of the following rules:

credit units may be passed from a node to another node;

the limit on the number of accumulated credit units for a node that serves other nodes increases in proportion to the number of other nodes that are served; and the cost of a radio resource allocation unit is proportional to an area, over which a reservation of the radio resource denies it to other users.

26. The apparatus of claim 24, where the auction process is used by said controller to obtain ownership of a particular radio resource allocation unit at some future time.

27. The apparatus of claim 21, said controller being embodied in a flexible spectrum use controller.

28. The apparatus of claim 21, where the spectrum is comprised of unlicensed spectrum.

29. The apparatus of claim 21, embodied as at least one integrated circuit that includes said radio interface or that is separate from said radio interface.

* * * * *